United States Patent [19]

Wright

[11] 4,388,277

[45] Jun. 14, 1983

[54] CATALYST DEVICE AND METHOD

[75] Inventor: Christopher J. Wright, Abingdon, England

[73] Assignee: United Kingdom Atomic Energy Authority, London, England

[21] Appl. No.: 269,394

[22] Filed: Jun. 1, 1981

[30] Foreign Application Priority Data

Jun. 6, 1980 [GB] United Kingdom ................. 8018652

[51] Int. Cl.³ ............................ B01J 8/02; B01J 35/02
[52] U.S. Cl. ....................................... 422/211; 261/94; 261/DIG. 72; 422/310
[58] Field of Search ................................... 261/94–98, 261/DIG. 72; 422/211, 212, 310

[56] References Cited

U.S. PATENT DOCUMENTS

| | | | |
|---|---|---|---|
| 1,141,266 | 6/1915 | Raschig | 261/DIG. 72 |
| 2,615,832 | 10/1952 | Dixon | 261/DIG. 72 |
| 2,940,168 | 6/1960 | Monroe | 261/DIG. 72 |
| 3,502,596 | 3/1970 | Sowards | 261/DIG. 72 |
| 3,506,248 | 4/1970 | Starbuck et al. | 261/DIG. 72 |
| 3,956,128 | 5/1976 | Turner | 261/DIG. 72 |
| 3,957,931 | 5/1976 | Ellis et al. | 261/DIG. 72 |
| 4,065,268 | 12/1977 | Betz | 422/211 |
| 4,195,043 | 3/1980 | Foote et al. | 261/DIG. 72 |

FOREIGN PATENT DOCUMENTS

| | | |
|---|---|---|
| 2365625 | 4/1973 | France . |
| 2375138 | 7/1978 | France . |
| 1491206 | 11/1977 | United Kingdom . |
| 2000045 | 1/1979 | United Kingdom . |

OTHER PUBLICATIONS

Chemical and Catalytic Reaction Engineering, "Analyses and Design of Heterogeneous Reactors", 1976, McGraw-Hill, pp. 519-521.

Primary Examiner—Richard L. Chiesa
Attorney, Agent, or Firm—Larson and Taylor

[57] ABSTRACT

A device and method for use in the catalysis of a chemical reaction having a container with a fluid inlet thereto and a fluid outlet therefrom and a plurality of catalyst bodies assembled therein.

In order to enhance the mixing of reactants in the device, the catalyst bodies are randomly arranged in the container and in order to reduce resistance to flow of reactants through the device, the catalyst bodies each have a plurality of internal channels of an ordered, pre-determined size and arrangement for permitting substantially unrestricted flow of reactants therethrough.

6 Claims, 6 Drawing Figures

CATALYST DEVICE AND METHOD

The invention relates to a device for use in the catalysis of chemical reactions; a container having a fluid inlet thereto and a fluid outlet therefrom has a plurality of discrete catalyst bodies randomly assembled therein.

Devices for the catalysis of chemical reactions where a plurality of catalyst bodies is housed in a container are known. Thus, a device in which a plurality of small (e.g. ~2 cm diameter or smaller) ceramic pellets incorporating a catalytically active material is housed in a container (or reactor) is described, for example, by J. J. Carberry in Chemical and Catalytic Reaction Engineering (1976), published by McGraw-Hill. Such pellets may, for example, be circular in cross-section and have a central hole; other geometrical forms are, however, known in the art. The surface area of the pellets is enhanced for catalytic purposes by providing them with a three-dimensional network of internal spaces, e.g. in the form of channels and/or pores. This network is, however, random in direction and connectivity; also some of the spaces may provide a through passage for fluid and others may not. Flow of fluid through the overall device is therefore subject to resistance giving rise to an energy-consuming pressure drop. Also, such devices are prone to suffer from attrition problems and dimensional changes of the pellets which may lead to "plugging" of the container (reactor). Also, a device is described in UK Patent Application Publication No 2000045A in which a plurality of discrete components carrying catalytically active material is housed in a container, each of the components being in wire-form and having an open-work three dimensional configuration, the wire-form at the periphery of the configuration defining open spaces small enough in relation to the shape and diameter of the wire-form at the periphery of other components to at least limit the penetration by intertangling therewith of one component into the internal open spaces of another component. Such devices, however, suffer from attrition problems because a large proportion of the catalytically active material is carried by surfaces of components which are liable to come into contact with surfaces of other components thereby leading to the possibility of attrition of the catalytically active material.

Also, devices for the catalysis of chemical reactions comprising a single body having a plurality of passageways therethrough and carrying catalytically active material are known. For example, a device comprising a monolith of a ceramic material carrying catalytically active material and having a honeycomb structure through which reactants flow axially is known. Similar single bodies from metal are also known, for example in the form of metal sheets having corrugations and wound in "Swiss-roll" fashion to define channels through the body. In the latter respect, reference is made to UK patent specifications Nos. 1,491,206, 1,491,198, 1,491,445, 1,491,199, 1,531,134 and 1,546,097. Such single body devices cannot, however, make use of existing containers, loading and handling equipment for the abovementioned ceramic pellets.

The present invention as claimed is intended to solve one or more of the problems referred to above associated with the above known devices. Thus, it enables replacement of the ceramic pellets or the components of the known devices above by catalyst bodies of similar configuration to the known single bodies above.

The invention provides in a first aspect a device for use in the catalysis of a chemical reaction which comprises a container having a fluid inlet thereto and a fluid outlet therefrom; a plurality of discrete catalyst bodies randomly assembled within the container, each body having a plurality of internal channels of an ordered, pre-determined size and arrangement thereby to permit substantially unrestricted flow of fluid through the body, and each body carrying a surface coating comprising catalytically active material for the reaction.

The channels in the bodies of the invention may be substantially parallel with respect to one another and, in the case of a cylindrical body, may be parallel with respect to the principal axis of the cylinder. Alternatively, individual channels may be parallel in one part of the body and perpendicular in another part of the body with respect to the principal axis. Other arrangements of channels are possible, dependent upon manufacturing feasibility and the requirements of the device.

In operation of the device, a fluid reactant or reactants are passed via the fluid inlet into the container. The reactant or reactants pass through the channels in the bodies thereby contacting the catalytically active material which catalyses the chemical reaction. The fluid product or products of the reaction leave the container via the fluid outlet.

The device of this invention has the practical advantage that it may be put into effect by employing existing equipment for containing small ceramic pellets such as referred to above. Thus, the catalyst bodies employed in the invention may be fabricated with a diameter (e.g. 1 cm) corresponding to the diameter of known ceramic pellets in order to make use of containers, loading and handling equipment for the latter without modification. Such simple substitution cannot be effected with a known large single body device such as referred to above. Also, known catalyst devices using pellets are prone to suffer from attrition problems and dimensional changes of the pellets which may lead to "plugging" of the container (reactor). Attrition problems are reduced in the case of devices of the invention since catalytically active material carried by the walls defining the channels of a particular catalyst body is protected from contact with any other catalyst body in the device, i.e., a significant part of the surface area of the catalyst body lies within a mechanically hard and resistant protective external boundary and is thus protected from attrition.

The resistance to flow of fluid through a device of the invention is less than that for a device incorporating small ceramic pellets and of similar dimensions. Thus, for the same energy consumption in causing fluid to pass through a device, the flow-rate of fluid through a device of this invention will be greater than that for a corresponding device containing ceramic pellets.

By "fluid" in this specification is meant fluid containing either the reactant or reactants for the reaction to be catalysed or the product or products of such reaction depending upon the context. The fluid may be a gas or a vapour or a liquid.

As a consequence of the random arrangement of the catalyst bodies in the container the mixing of reactants in a device of this invention is considerably enhanced in comparison with one or more large single body catalyst devices. Thus, heat and mass transfer are considerably enhanced which can give rise to increased yield of desired product(s). The random arangement also offers the advantage of ease of manufacture of the device.

The catalyst bodies in a device of the invention may have substantially similar dimensions. In some applications, however, it is preferred that a device of the invention contains catalyst bodies which are not all of the same external dimensions. In this way, density of packing of the bodies in a device can be controlled and physical obscuration of one body by another in a device of the invention can be minimised. Preferably, the catalyst bodies of the invention consist of two groups of catalyst bodies, namely a first group wherein each of the bodies has substantially the same external dimensions as other bodies in that group, and a second group wherein each of the bodies has substantially the same external dimensions as other bodies in that group, the external dimensions of the bodies of the first group being different from those of the bodies of the second group. Such external dimensions clearly depend upon the shape of the body and by "different" above is meant that one or more of the external dimensions are different. For example, where the bodies are in the form of a cylindrical honeycomb, the device may contain a plurality of first bodies having a particular length and diameter together with a plurality of second bodies having a different length and/or diameter from those of the first bodies. In such a preferment, the relative numbers of bodies from the two groups, the external dimensions of bodies within each group and the shapes of bodies within each group should be chosen to produce a random arrangement of bodies in the container with a desired packing. The density of the channels and/or the arrangement of the channels in individual bodies need not necessarily be the same in all bodies in a particular device.

Catalyst bodies for use in this invention having a plurality of channels in substantially parallel arrangement with respect to one another way, for example, have from 400 to 4 channels per square centimeter of the portion of the body at right angles to the direction of the channels. Preferably, there are from 200 to 25 such channels per square centimeter in order to maximise surface area and minimise the risk of blockage of the channels when the device is in use.

Devices of this invention may be suitable for use in the catalysis of a range of chemical reactions. They are, however, particularly appropriate in the catalysis of exothermic and endothermic reactions and those where high space velocities are required, such as steam reforming, methanation, selective oxidation, the oxidation of ammonia in the manufacture of nitric acid, the oxidation of $SO_2$ in the manufacture of sulphuric acid and oxychlorination. The devices can also be used in the removal of pollutants from vehicle exhaust emissions such as soot, unburnt hydrocarbons, carbon monoxide and oxides of nitrogen, and in the removal of the particulate matter from Diesel engine emissions. The low pressure drop characteristics of the device when in use and the resistance of the catalyst bodies to attrition makes devices of the invention particularly suitable for this application. Also, the devices of the invention possess great flexibility in that containers of varying shape may be provided with catalyst bodies in order to constitute devices of the invention. The known pelleted catalysts, when used to remove pollutants from engine exhaust emissions, may suffer from attrition problems if packed loosely or may give rise to too great a back pressure if packed tightly. The devices of this invention do not suffer from these disadvantages.

The catalyst bodies may be made of a ceramic material or of a metal. Examples of suitable ceramic materials are mullite, cordierite, silicon carbide, silicon nitride and zirconia. Examples of suitable metals are aluminium bearing iron base alloys, aluminium, stainless steels and high Ni content steels. An example of an aluminium bearing iron base alloy has a composition by weight of 10 to 30% Cr, 1 to 10% Al, 0 to 0.5% C, and the balance Fe. Such alloys are available in the UK under the UK Registered Trade Mark "FECRALLOY".

Where resistance to high temperature embrittlement is important such alloys are made within the specification of a composition by weight of up to 20% Cr, 1 to 10% Al, 0.1 to 3.0% Y and the balance Fe. Where a degree of high temperature embrittlement can be tolerated, as for example where a helical coiled wire configuration is employed, higher chromium content up to 25% by weight may be employed. The particularly preferred composition is a FECRALLOY (Registered Trade Mark) alloy having 15.50 to 16.50% Cr, 4.6 to 5.6% Al, 0.3 to 1.0% Y and the balance Fe.

The above mentioned alloys may include additions of Co and/or Ni and it is envisaged that such inclusions should be limited to the range 0 to 3% by weight of each element. However, acceptable performance may be achieved with these additions in the range 0 to 5% Co, and 0 to 5% Ni.

An alternative alloy is that sold under the UK Registered Trade Mark KANTHAL DSD. A typical example of such an alloy has an approxiate composition by weight of 22.5% Cr, 4.5% Al, 2.0% Co, 0.1% C and the balance Fe.

A catalyst body of ceramic material for use in the invention may be fabricated by methods known in the art and may, for example, be fabricated with a honeycomb structure for use in the invention. A catalyst body of metal for use in the invention may be fabricated, at least in part, of corrugated metal defining the channels through the body. For example, a metal catalyst body for use in the invention may comprise spirally wound alternate plain and corrugated sheets wound in 'Swiss-roll' type fashion. Such a body may be held together by any suitable externally applied fastening means such as wire, a split ring or a washer, or by welding. Spot or line welding are preferred since they effect a permanent fastening.

The surface coating on the catalyst bodies may comprise one or more transition metal elements or a compound thereof as the catalytically active material, for example the metals Fe, Co, Ni, Ru, Rh, Pd, Os, Ir, Pt, Cu, Ag, Au and the oxides and mixed oxides of V, Cr, Mo, W and Mn. The choice of catalytically active material is in practice determined to a large extent by the reaction to be treated by catalysis. Preferably, the catalytically active material is supported by a ceramic coating, for example, a refractory oxide coating such as $Al_2O_3$, $CeO_2$, $Y_2O_3$, $TiO_2$, $ZrO_2$, $ThO_2$ and $SiO_2$. Such coatings may be applied by methods known in the art, for example, as described in UK patent specification No 1,568,861.

In a second aspect, the invention provides a method of making a device for use in the catalysis of a chemical reaction which comprises (i) fabricating a plurality of bodies each having a plurality of internal channels of ordered pre-determined size and arrangement thereby to permit substantially unrestricted flow of fluid through the body;

(ii) coating the bodies with a catalytically active material to give catalyst bodies; and (iii) assembling the catalyst bodies randomly in a container having a fluid inlet and thereby a fluid outlet therefrom.

The catalytically active material may be applied by methods known in the art, for example by solution impregnation followed by decomposition, sputtering, plasma coating flame spraying, vapour deposition or sintering.

Optionally, a ceramic coating may be provided either before or during step (ii), e.g. by contacting the bodies with a dispersion in a liquid medium convertible on subsequent drying and firing into a ceramic, followed by drying and firing.

In a further aspect the invention provides a method of catalysis of a chemical reaction which comprises passing a reactant or reactants for the reaction through a device according to the invention under conditions for the catalytically active material to effect catalysis of the reaction.

The invention will now be particularly described, by way of example only, as follows where reference will be made to FIGS. 1 to 6, of the accompanying drawings wherein FIG. 1 is a side view in median section of a catalyst device for the catalysis of chemical reactions involving fluids;

The "FECRALLOY" alloy used had a composition by weight of 4.6 to 5.6% Al, 15.5 to 16.5% Cr, 0.3 to 1.0% Y and the balance Fe.

Figure 1:
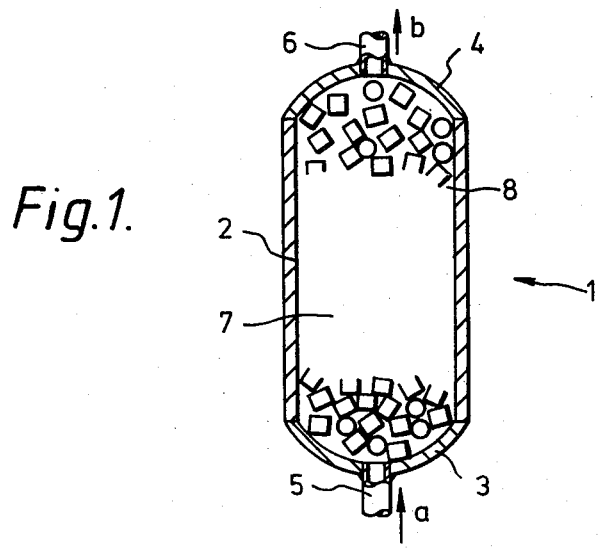

Referring to FIG. 1, a container 1, comprises a central cylindrical portion 2 and a lower end portion 3 and an upper end portion 4. The lower end portion 3 carries an inlet pipe 5 for conveying fluids to the container 1 and the upper end portion 4 carries an outlet pipe 6 for conveying fluids from the container 1. The container 1 carries a bed 7 comprising a plurality of catalyst bodies 8 randomly assembled within the container 1.

Figure 2:
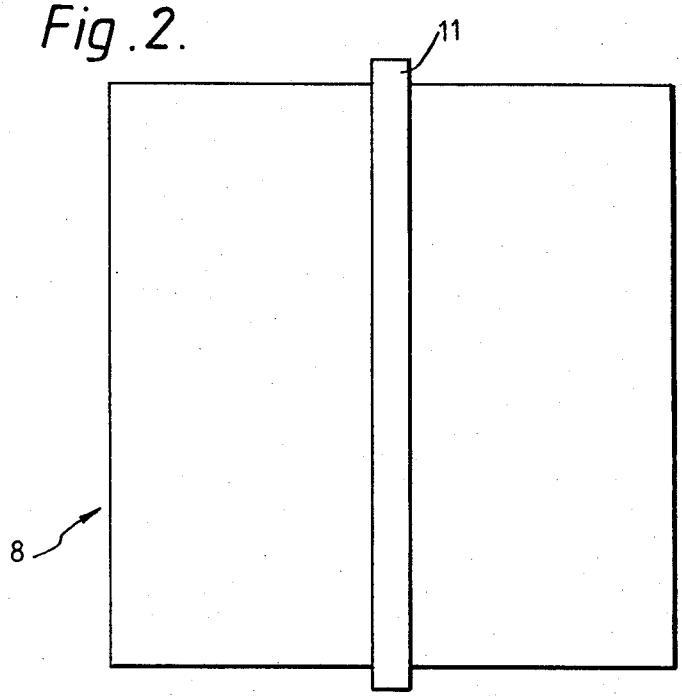
FIG. 2 is a side elevation of a catalyst body suitable for use in a device as shown in FIG. 1.
Figure 3:
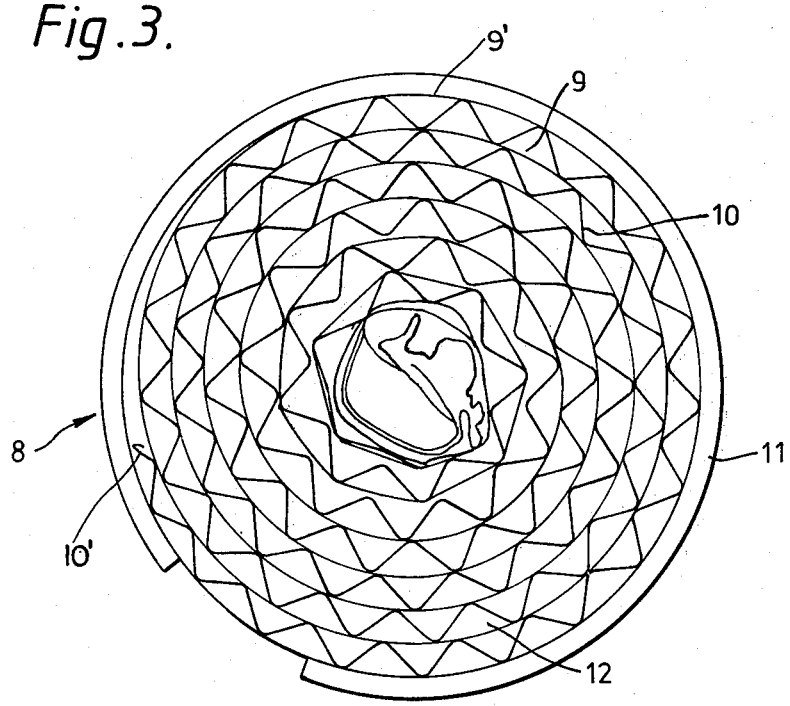
FIG. 3 is an end elevation corresponding to FIG. 2.

Referring to FIGS. 2 and 3, an example of a catalyst body 8 is shown in more detail. Each body comprises alternate plain sheets 9 and corrugated sheets 10 spirally wound in a coil in 'Swiss-roll' type fashion. Each of the sheets 9 and 10 is fabricated of metal. A metal restraining ring 11 is positioned around the coil to prevent it from unwinding. The sheets 9 and 10 define a plurality of passageways 12 extending through the catalyst body 8. The sheets 9 and 10 each carry a layer of a carrier material (not shown), which in turn carries a layer of a catalytically active material (not shown). As shown most clearly in FIG. 3, a portion 9' of plain sheet 9 extends beyond the outer end 10' of corrugated sheet 10. Thus, the external coil of corrugated sheet 10 is covered by plain sheet 9 which thus forms the protective external boundary mentioned above.

In operation of the device shown in FIG. 1, fluid reactants are passed via the inlet pipe 5 into the container 1 in the direction shown by the arrow a. The reactants pass through the bed 7 and hence through the passageways 12 in the catalyst bodies 8 thereby contacting the catalytically active material (not shown) which catalyses a chemical reaction in the reactants. A product of the chemical reaction issues from the container 1 via the outlet pipe 6 in the direction shown by the arrow b.

EXAMPLE

Two hundred catalyst bodies such as depicted in FIGS. 2 and 3 were prepared as follows:

Plain strips of "FECRALLOY" alloy and corrugated strips of "FECRALLOY" alloy (grooves 1 mm deep) each of width 17 mm were spirally wound to produce a plurality of coils of diameter 17 mm and height 17 mm and of generally right cylindrical shape. Each coil was prevented from unwinding by a metal restraining ring.

The coils were degreased and pre-oxidised by heating in air at 1000° C. Two hundred such coils were then placed in a tray and coated with alumina by contacting with a wash-coat comprising an alumina sol (60 g/l of $Al_2O_3$) into which commercially available, non dispersible alumina particles (200 g/l), had been stirred followed by drying at 100° C. and firing at 600° C.

The alumina had been prepared as described in UK patent specification No. 1,568,861. Thus, alumina which had been prepared by a vapour phase condensation method such as flame hydrolysis was formed into the sol by admixture with water. This alumina coating process may be repeated if a thicker coating is desired. Coatings of thickness up to about 100 microns may be achieved.

The alumina coated coils comprising 8 weight percent of alumina were then provided with a NiO coating as a catalytically active material by contacting with a solution of $Ni(NO_3)_2$, followed by drying and firing to convert the salt into the oxide. This gave 16 weight percent of NiO. This can be reduced to the catalytically active material Ni, e.g. in situ. An alternative way of providing the catalytically active material is to coat with a sol containing Ni compounds followed by drying and firing and ultimately reduction.

The resultant catalyst bodies were randomly packed in a container comprising a glass column of 15 cm diameter and 65 cm in length provided with inlet and outlet pipes to give a device such as shown in FIG. 1 above.

Properties (i) Pressure Drop Characteristics

The pressure drop characteristics of the above device were determined by measuring the pressure drop per unit length of the device at different gas velocities through the device per unit cross-sectional area of the device. The results are shown in FIG. 4.

By way of comparison, similar determinations were carried out on a device of identical dimensions but containing, instead of catalyst bodies, an identical number of Pall rings of similar external dimensions to the above catalyst bodies (Pall rings are available commercially for use as adsorption column packings). The results are shown in FIG. 5.

Also by way of comparison, similar determinations were carried out on a device of identical dimensions but containing, instead of catalyst bodies, an identical number of solid ceramic pellets of similar external dimensions to the above catalyst bodies and having a central hole of about 6 mm diameter. The results are shown in FIG. 6.

Figure 4:
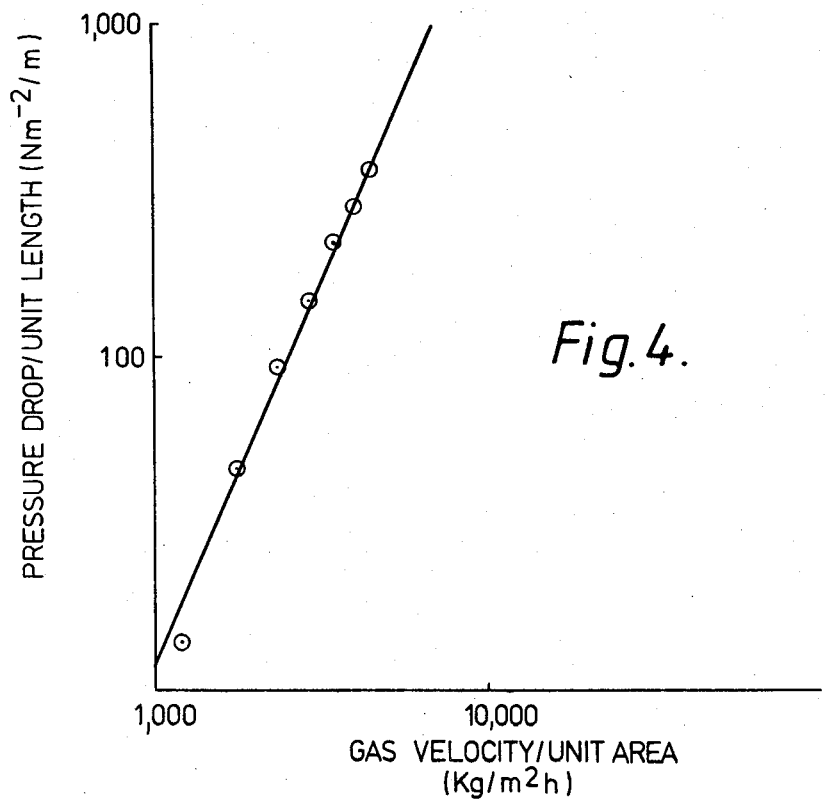
FIG. 4 is a log-log graph of pressure drop per unit length against gas velocity per unit cross-sectional area for a device such as depicted in FIG. 1.
Figure 5:
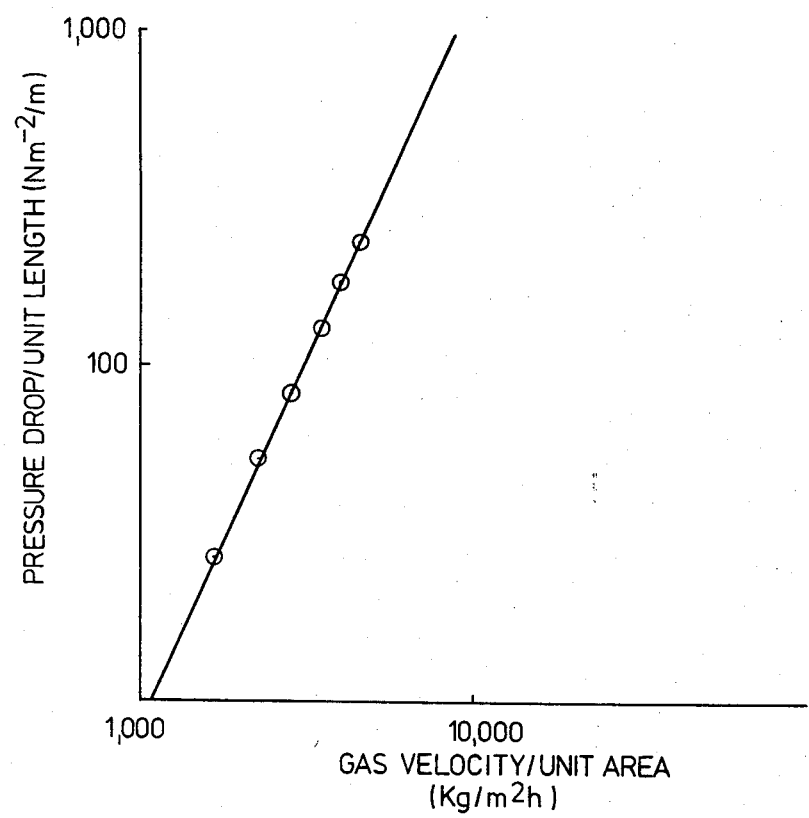
FIG. 5 is a similar graph to FIG. 4 but for a device containing Pall rings.
Figure 6:
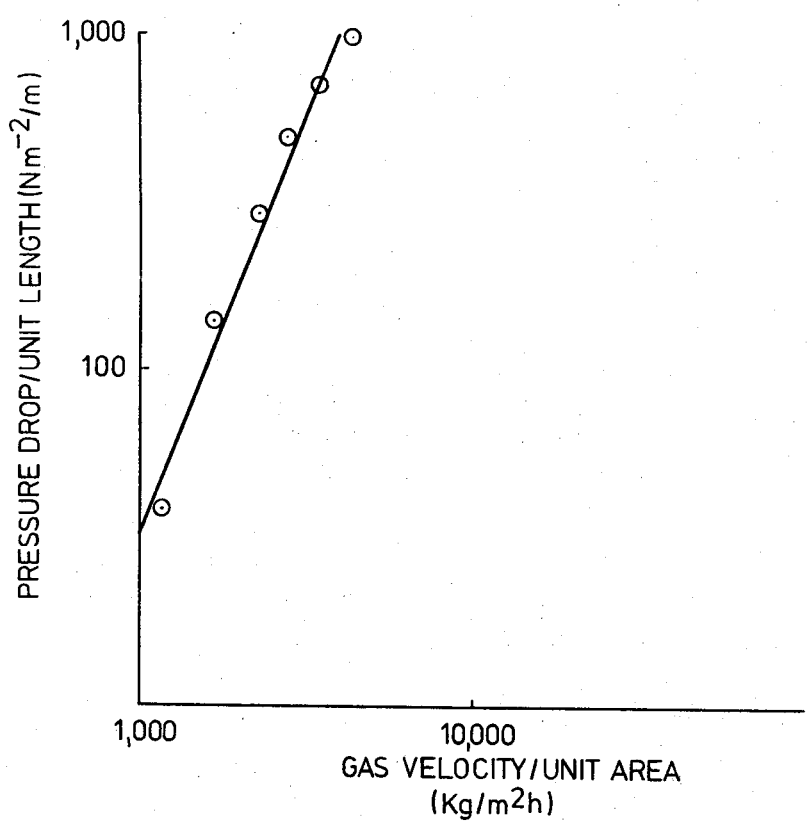
FIG. 6 is a similar graph to FIG. 5 but for a device containing solid ceramic pellets.

Referring to FIGS. 4 to 6, it will be seen that the pressure drop characteristics of the device of the invention (FIG. 4) are of the same order as those of comparative devices (FIGS. 5 and 6). The catalyst bodies used to obtain the results shown in FIG. 4 have a much greater superficial surface area than the Pall rings and solid pellets used to obtain the results shown in FIGS. 5 and 6 respectively. For example, the catalyst bodies used had a superficial surface area of 173.4 cm$^2$ per body whilst the Pall rings used had a superficial surface area of 5.4 cm$^2$ per ring. Thus, on the evidence of the above results, the device of the invention therefore provides a high superficial surface area (which is very valuable for catalytic purposes) in combination with useful pressure drop characteristics.

(ii) Catalysis

Devices similar to that described above with reference to FIGS. 1 to 3 were found to be highly satisfactory in the catalysis of steam reforming methanation reactions.

I claim:

1. In a method of catalysis of a chemical reaction which comprises passing a reactant or reactants for the reaction through a device under conditions for the catalytically active material to effect catalysis of the reaction, said device comprising a container having a fluid inlet thereto and a fluid outlet therefrom and a plurality of discrete catalyst bodies randomly assembled therein, each body carrying a surface coating comprising catalytically active material for the reaction, the improvement wherein each body is right cylindrical in shape and has a plurality of internal channels of an ordered, predetermined size disposed in substantially parallel arrangement with respect to one another to permit substantially unrestricted flow of fluid through the body, each body having from 25 to 200 hannels per sq cm in a plane at right angles to the direction of the channels, and each body having a protective external boundary to protect the body from attrition.

2. In a device for use in the catalysis of a chemical reaction comprising a container having a fluid inlet thereto, a fluid outlet therefrom and a plurality of discrete catalyst bodies randomly assembled therein, each body carrying a surface coating comprising catalytically active material for the reaction, the improvement wherein each body is right cylindrical in shape and has a plurality of internal channels of an ordered, pre-determined size disposed in substantially parallel arrangement with respect to one another to permit substantially unrestricted flow of fluid through the body, each body having from 25 to 200 channels per sq cm in a plane at right angles to the direction of the channels, and each body having a protective external boundary to protect the body from attrition.

3. A device as claimed in claim 2 wherein the catalyst bodies are not all of the same external dimensions.

4. A device as claimed in claim 3 wherein the catalyst bodies consist of two groups: a first group wherein each of the bodies has substantially the same external dimensions as other bodies in that group, and a second group wherein each of the bodies has substantially the same external dimensions as other bodies in that group, the external dimensions of the bodies of the first group being different from those of the bodies of the second group.

5. A device as claimed in claim 2 wherein each body is in the form of one or more wound metal sheets shaped where appropriate to define the channels in substantially parallel arrangement with respect to one another.

6. A device as claimed in claim 5 wherein the metal is an aluminium bearing iron base alloy.

* * * * *